United States Patent [19]
Yokoyama et al.

[11] Patent Number: 5,801,358
[45] Date of Patent: Sep. 1, 1998

[54] METHOD FOR DISINTEGRATING JOINED STRUCTURE WITH HIGH FREQUENCY FIELDS

[75] Inventors: Sadahiko Yokoyama; Masatoshi Iji, both of Tokyo, Japan

[73] Assignee: NEC Corporation, Tokyo, Japan

[21] Appl. No.: 883,602

[22] Filed: Jun. 26, 1997

Related U.S. Application Data

[62] Division of Ser. No. 685,665, Jul. 24, 1996.

[30] Foreign Application Priority Data

Jul. 25, 1995 [JP] Japan .................... 7-188735

[51] Int. Cl.$^6$ .................... H05B 6/14; H05B 6/80; B23P 19/06
[52] U.S. Cl. .................... 219/634; 219/633; 219/635; 219/679; 219/759; 29/403.4; 29/426.4; 29/426.5
[58] Field of Search .................... 219/603, 633, 219/634, 635, 679, 601, 759; 29/403.4, 403.3, 426.1, 426.4, 426.5; 156/344

[56] References Cited

U.S. PATENT DOCUMENTS

| | | | |
|---|---|---|---|
| 2,291,862 | 8/1942 | Bailey | 29/426.4 |
| 2,711,984 | 6/1955 | Kingman | 156/344 |
| 3,612,803 | 10/1971 | Klaas | 219/634 |
| 3,771,209 | 11/1973 | Bennnett, Jr. | 219/603 |
| 4,110,506 | 8/1978 | Cottingham et al. | 156/273.9 |
| 4,418,260 | 11/1983 | Detrick | 219/635 |
| 5,003,144 | 3/1991 | Lindroth et al. | 219/679 |

FOREIGN PATENT DOCUMENTS

5-138799  6/1993  Japan .

*Primary Examiner*—Philip H. Leung
*Attorney, Agent, or Firm*—Sughrue, Mion, Zinn, Macpeak & Seas, PLLC

[57] ABSTRACT

A joining member for joining parts or materials to form a joined structure is constituted by a composite material containing a heating assistant in a matrix material. For disintegrating the joined structure, it is placed in a heating zone, and a high frequency magnetic field or a high frequency electric field, or a high frequency magnetic field and a high frequency electric field are applied to the joining member. The heating assistant may be in a form of a particle or a fiber containing at least one of a soft magnetic material, an electrically conducting material and a dielectric material. The matrix material may be plastic or ceramic. The disintegration of the joined structure can be efficiently and selectively carried out, thus contributing to efficient recycling.

4 Claims, 1 Drawing Sheet

METHOD FOR DISINTEGRATING JOINED STRUCTURE WITH HIGH FREQUENCY FIELDS

This is a divisional of application Ser. No. 08/685,665, filed Jul. 24, 1996.

BACKGROUND OF THE INVENTION

(1) Field of the Invention

The present invention relates to a joining member for making joints between things or parts, such as between two parts, a part and a base material, and two base materials, and a method for disintegrating the structure thus joined by such a joining member.

(2) Description of the Related Art

Examples of the joining members conventionally used for the joining two parts, a part and a base material, and two base materials include a screw, a bolt and nut, a rivet, a nail, and a tack that are made of metal or plastic. FIG. 1 shows a conventional joining member. For disintegrating the structure joined by such a joining member, there are methods in which the structure is disintegrated by using manual or electrically-driven tools such as drivers and pliers and in which the joining member itself is cut apart. Also, for recycling, there is a method in which the parts and materials are all crushed or taken to pieces and then any useful objects are collected from waste.

However, in the method in which the disintegration relies on drivers and pliers or in which the joining member itself is cut apart, a worker is required to locate such a joining member and then to select the tools to be used for the work of the disintegration, thus requiring enormous time. Especially, where the parts and the base materials are three-dimensional complexes, the disintegration work cannot be carried out unless an appropriate tool is available. Further, in the method in which, for purposes of recycling, the entire parts and materials are crushed, the useful objects and the waste are unavoidable mixed, thus making it impossible to selectively collect only the useful objects, so that the recycling efficiency is markedly reduced. Also, when the entire structure is crushed in the case where the part or material contains a poisonous or harmful material, it is very difficult to selectively remove the harmful material from the crushed objects and, since the crushed objects contaminated by the harmful material cannot be recycled, all the objects must be disposed of as waste.

SUMMARY OF THE INVENTION

It has long been desired to realize a method with which the structure joined by a joining member can be efficiently disintegrated.

According to one aspect of the invention, there is provided a joining member for joining two parts, a part and a base material, or two base materials, the joining member comprising:

a matrix material;

a heating assistant contained in the matrix material, the matrix material and the heating assistant constituting a composite material.

The joining member may have the heating assistant which is in the form of at least one of a particle, a fiber, a needle and a sheet which contains at least one of a soft magnetic material, an electrically conducting material and a dielectric material.

The matrix material of the joining member may be one of plastic and ceramic.

According to a second aspect of the invention, there is provided a method for disintegrating a joined structure in which two parts, a part and a base material, or two base materials are joined by a joining member constituted by a composite material containing a heating assistant, the method comprising the steps of:

placing the joining member in a heating zone; and applying one of a high frequency magnetic field and a high frequency electric field, or both a high frequency magnetic field and a high frequency electric field to the joining member.

The method for disintegrating a joined structure may further include a step of applying an external force including at least one of impact force, pulling force and vibrating force to at least one of the joining member, the part and the base material.

The "joining member" used in describing the present invention refers to an object which is used for the joining two parts, a part and a base material, and two base materials, taking a form such as a screw, a bolt and nut, a rivet, a nail, and a tack.

Also, the "soft magnetic material" used in describing the present invention refers to a ferromagnetic material with a low coercive force and having a property in which the material is easily magnetized by an external magnetic field but the magnetization seemingly disappears once the external magnetic field is removed, with examples of such material being ferrite, iron, and permalloy which is alloy of nickel and iron.

Example of electrically conducting materials include carbon black, carbon fiber, copper, aluminum, iron and permalloy. Examples of materials which have both the properties of the soft magnetic material and the electrically conducting material include iron and permalloy. As dielectric materials, those which have comparatively high dielectric constant such as barium titanate and chloroprene rubber are effectively usable. The heating assistant used in the invention may be a soft magnetic material, an electrically conducting material, a dielectric material or a mixture thereof.

Examples of plastics used as a matrix material of a composite material containing the heating assistant include thermoplastics such as polycarbonate, polyacetal, denatured polyphenylene ether, acrylonitrile-butadiene-styrene copolymer, polypropylene, polystyrene, and thermosetting resins such as epoxy resin and phenol resin. But, generally it can be said that plastics of any kind are effectively usable for the present invention. As ceramics, sintered metal oxides such as alumina, and glasses may be used, and those having comparatively low melting points are preferred.

The "high frequency magnetic field" used during the disintegration of the joined structure refers to an alternating magnetic field whose direction changes periodically, and this high frequency magnetic field is preferably not lower than 50 Hz and not higher than 100 GHz. Also, the "high frequency electric field" means an alternating electric field whose direction changes periodically, and this high frequency electric field is preferably not lower than 50 Hz and not higher than 100 GHz. According to the invention, use can be made of an ordinary electromagnetic wave and also an electromagnetic wave generally called "microwave" which has the properties of both the high frequency magnetic field and the high frequency electric field. Also, it is possible to apply high frequency magnetic fields or high frequency electric fields having different frequencies, or a high frequency magnetic field and a high frequency electric field at the same time to the joining member. Further, in carrying out this method, the high frequency magnetic field and/or the high frequency electric field may be applied to the joining member either continuously or intermittently.

Now, the functional aspects of the invention are briefly explained. When the high frequency magnetic field is applied to the joining member containing a soft magnetic material as a heating assistant, this heating assistant is heated selectively because of hysteresis loss. Also, where the high frequency magnetic field is applied to the joining member containing an electrically conducting material as a heating assistant, this heating assistant is selectively heated because of Joule heating loss. Further, where the high frequency electric field is applied to the joining member containing a dielectric material as a heating assistant, this heating assistant is selectively heated because of dielectric loss. When the heating assistant is thus heated, the matrix material of the joining member is heated resulting in the melting or dissolution of the matrix material. Because of the melting or dissolution of the joining member, the related parts and base materials are disintegrated by gravity. If, during or after the application of the high frequency magnetic field or the high frequency electric field, a brief external force is applied to the joining member and/or the joined structure, the efficiency of disintegrating the joined structure is further enhanced. Preferred examples of external forces include an impact force, a pulling force or a vibrating force.

Even when two different joining members contain the same quantity of the same heating assistant, if the matrix pie materials of the joining members are different, the heating efficiencies of the matrix materials are different so that the disintegration may be controlled by varying the time for applying the high frequency magnetic field or the high frequency electric field. This allows the selective disintegration of only certain parts or certain materials.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Figure 1:
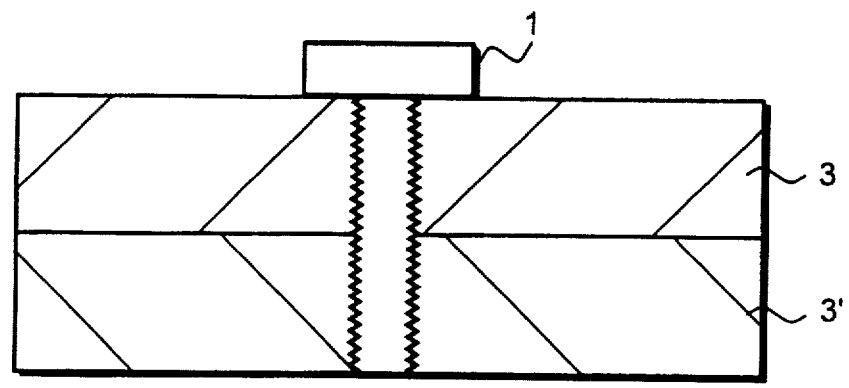
FIG. 1 is a diagrammatic sectional view of a conventional joining member.

Now, preferred embodiments of the invention are explained with reference to the drawings.

In a first embodiment, two plates of epoxy resin are joined by a screw of a polycarbonate containing ferrite particles. For disintegration, a high frequency magnetic field is applied thereto. Each of the epoxy resin plates has a length of 30 mm, a width of 30 mm and a thickness of 3 mm, and has a screw hole having a diameter of 5 mm at its center. The joining member is a screw of polycarbonate containing 10% by weight of Ni-Zn-ferrite having an average particle diameter of 50 μm as a heating assistant. This screw has a joining portion having a diameter of 5 mm and a length of 6 mm and a screw head having a diameter of 8 mm. The high frequency magnetic field is generated by connecting a high frequency output device to a magnetic field generating coil. The diameter of the magnetic generating coil is 50 mm, the number of turns is 5 times and the size of the copper wire is 3 mm. The high frequency output device has a high frequency output of 2 kW and an output frequency of 400 kHz. The epoxy resin plates joined by the polycarbonate screw is placed at the center of the magnetic field generating coil, and the high frequency magnetic field is continuously applied by using the high frequency output device. Then, in 7 seconds, the polycarbonate screw turns to a molten state and the two plates forming the joined structure can be disintegrated by gravity. Under ordinary conditions when the high frequency magnetic or electric field is not applied, the screw can be driven-in or driven-out by an ordinary driver.

In a second embodiment, a plate of epoxy resin and a plate of phenol resin are joined by a bolt and nut of polyacetal containing carbon black, and the high frequency magnetic field is applied thereto. Each of the epoxy resin plate and the phenol resin plate has a length of 30 mm, a width of 30 mm and a thickness of 3 mm, and has a screw hole having a diameter of 5 mm at its center. The joining member is a bolt and nut of polyacetal containing 5% by weight of carbon black having an average diameter of 0.05 μm as a heating assistant. This bolt and nut has a joining portion having a diameter of 6 mm and a length of 6 mm, and has a bolt head having a diameter of 8 mm and a nut having a diameter of 8 mm. The high frequency magnetic field is generated by connecting the same high frequency output device as used in the first embodiment to the same magnetic field generating coil also as used in the first embodiment. The epoxy resin plate and the phenol resin plate joined by the bolt and nut of polyacetal are placed at the center of the magnetic field generating coil, and the high frequency magnetic field is continuously applied by using the high frequency output device. Then, in 18 seconds, the polyacetal bolt and nut turns to a molten state. Although this state allows the joined structure to be disintegrated by gravity, an impact force with an impact energy of 1.2 J/cm$^2$ is applied as an external force to the two plates from their sides, and this allows the two plates to be more readily disintegrated. Under ordinary conditions when the high frequency magnetic or electric field is not applied, this bolt and nut can be driven-in or driven-out by ordinary drivers or pliers.

Figure 2:
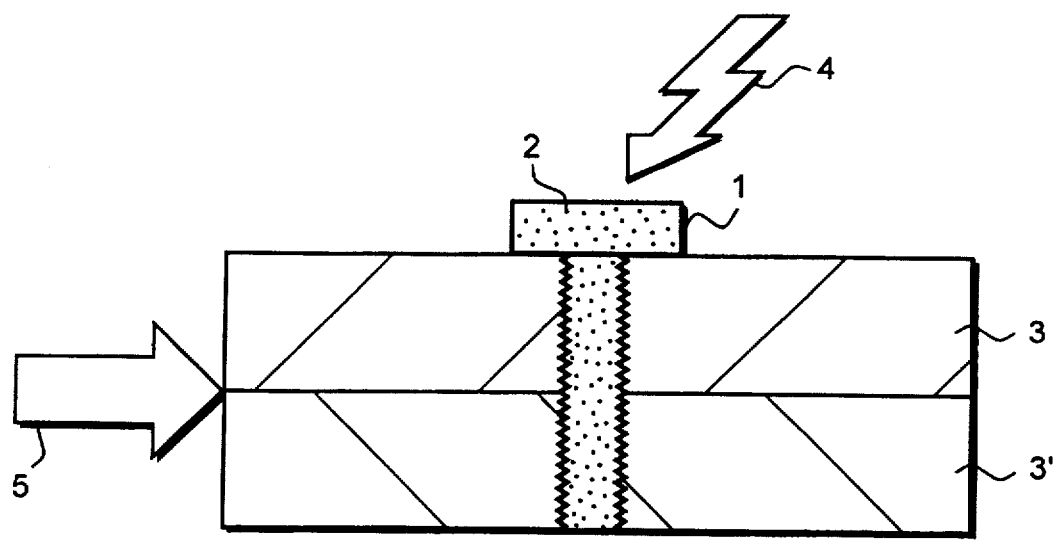
FIG. 2 is a diagrammatic sectional view of a joining member according to the invention, for use in explaining the structure thereof and the method for disintegrating the joined structure.

A third embodiment is explained with reference to FIG. 2. A plate 3 of epoxy resin and a plate 3' of glass are joined by a screw 1 of denatured polyphenylene ether containing carbon fibers 2, and the high frequency magnetic field 4 is applied thereto. Each of the epoxy resin plate and the glass plate has a length of 30 mm, a width of 30 mm and a thickness of 3 mm, and has a screw hole having a diameter of 5 mm at its center. The joining member 1 is a screw of denatured polyphenylene ether containing 2% by weight of carbon fiber having an average fiber length of 100 μm and a diameter of 10 μm as a heating assistant. This screw has a joining portion having a diameter of 5 mm and a length of 6 mm, and has a screw head having a diameter of 8 mm. The high frequency magnetic field is generated by connecting the same high frequency output device as used in the first embodiment to the same magnetic field generating coil also as used in the first embodiment. The epoxy resin plate and the glass plate joined by the denatured polyphenylene ether screw are placed at the center of the magnetic field generating coil, and the high frequency magnetic field is continuously applied by using the high frequency output device and, at the same time, a vibrating force with an amplitude of 1 mm and a vibration frequency of 50 Hz is applied as an external force 5 to the two plates 3 and 3' forming the joined structure. Then, in 16 seconds, the screw of denatured polyphenylene ether turns to a molten state, and the two plates forming the joined structure is more efficiently disintegrated than when the external force is not applied. In this embodiment, the vibrating force is applied in the direction vertical to the plates. Under ordinary conditions when the high frequency magnetic or electric field is not applied, this screw can be driven-in or driven-out by ordinary drivers and pliers.

In a fourth embodiment, an epoxy resin plate and a glass plate are joined by a screw of polyacetal containing carbon black, and the high frequency magnetic field the high frequency electric field are applied thereto. Each of the epoxy resin plate and the glass plate has a length of 30 mm, a width of 30 mm and a thickness of 3 mm, and has a screw hole having a diameter of 5 mm at its center. The joining member is a screw of polycarbonate containing 5%by weight of carbon black having an average diameter of 0.05 μm as a heating assistant. The screw has a joining portion having a diameter of 5 mm and a length of 6 mm, and has a screw head having a diameter of 8 mm. The high frequency magnetic field and the high frequency electric field are generated by a microwave oven with an output of 1.5 kW and an output frequency of 2.45 GHz for business use. The high frequency magnetic field and the high frequency electric field generated here refer to the electromagnetic wave within the frequency region generally called "microwave". The epoxy resin plate and the glass plate joined by the polycarbonate screw are placed at the center of the heating portion of the microwave oven, and the high frequency magnetic field and the high frequency electric field are continuously applied. Then, in 8 seconds, the polycarbonate screw turns to a molten state. Although this state allows the joined structure to be disintegrated by gravity, an impact force with an impact energy of 1.2 J/cm$^2$ is applied as an external force to the two plates from their sides, and this allows the joined two plate structure to be more readily disintegrated. Under ordinary conditions when the high frequency magnetic or electric field is not applied, this screw can be driven-in or driven-out by ordinary drivers or pliers.

In a fifth embodiment, two plates of phenol resin are joined by a rivet of acrylonitrile-butadiene-styrene copolymer (herein after referred to as "ABS" resin) containing particles of barium titanate, and the high frequency electric field is applied thereto. Each of the phenol resin plates has a length of 30 mm, a width of 30 mm and a thickness of 3 mm, and has a screw hole having a diameter of 5 mm at its center. The joining member is the rivet containing 5%by weight of barium titanate having an average diameter of 30 μm as a heating assistant. This rivet has a joining portion having a diameter of 5 mm and a length of 6 mm, and has a rivet head having a diameter of 8 mm. The high frequency electric field is generated by connecting a high frequency output device to two electrode plates opposing to each other. Each of the electrode plates is an iron plate having a length of 50 mm, an width of 50 mm and a thickness of 3 mm, and the two plates are spaced with each other by 10 mm. The high frequency output device is with a high frequency output of 2 kW and an output frequency of 13.6 MHz. The two phenol resin plates joined by the ABS resin rivet are placed between two electrode plates, and the high frequency electric field is continuously applied by using the high frequency output device. Then, in 34 seconds, the ABS resin turns to a molten state. Although this state allows the joined structure to be disintegrated by gravity, a pulling force with a pulling energy of 2.6 kgf/cm$^2$ is applied as an external force to the two plates, and this allows the two plates to be more readily disintegrated. In this embodiment, the pulling force is applied in the direction perpendicular to surfaces of the plates.

According to the invention, as already explained, whereas the structure joined by the conventional joining member was not easily disintegrated with efficiency, the structure joined by the joining member according to the invention can be disintegrated easily and efficiently. Also, the joining member according to the invention is such that it can be handled in the same way as the ordinary joining member when the high frequency magnetic field or electric field is not being applied thereto.

According to the invention, by using the high frequency magnetic field or the high frequency electric field, it is made possible to disintegrate the joined structure even when a tool cannot be used for the disintegration because of the location of the joining member in, for example, a three dimensional arrangement. When the high frequency magnetic or electric field is not being applied, the joining member is the same as an ordinary joining member such as a screw, bolt and nut, and a rivet, permitting it to be driven-in or driven-out by an ordinary tool and to be used for such purposes as replacing or repairing of defective parts or materials. Thus, in the course of fabrication of, for example, electronic devices, the conventional assembling facilities and steps may be used without any changes, and the high frequency magnetic or electric field may be applied when the structure is to be disintegrated for recycling purposes. Further, according to the invention, it is possible to control where and what to disintegrate by the selection of the heating assistant and the matrix material as well as the time period of the application of the high frequency magnetic or electric field, and this makes it possible to collect parts or materials of the same kind on a part to part or a material to material basis, thus markedly enhancing a recycling efficiency. That is, the parts or materials containing large amount of reusable objects are efficiently collected. Also, where the parts or materials contain harmful objects, such objects may easily be removed selectively so as to prevent the reusable objects from being contaminated.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A method of disintegrating a joining member of a joined structure in which two parts, a part and a base material, or two base materials are joined by said joining member constituted by a composite material containing a heating assistant, said method comprising the steps of:

placing said joining member in a heating zone; and applying one of a high frequency magnetic field and a high frequency electric field to said joining member in order to disintegrate said joining member.

2. A method for disintegrating a joined structure according to claim 1, which further comprises the step of:

applying an external force including at least one of impact force, pulling force and vibrating force to at least one of said joining member, said part and said base material.

3. A method of disintegrating a joining member of a joined structure in which two parts, a part and a base material, or two base materials are joined by said joining member constituted by a composite material containing a heating assistant, said method comprising the steps of:

placing said joining member in a heating zone; and applying both a high frequency magnetic field and a high frequency electric field to said joining member in order to disintegrate said joining member.

4. A method for disintegrating a joined structure according to claim 3, which further comprises the step of:

applying an external force including at least one of impact force, pulling force and vibrating force to at least one of said joining member, said part and said base material.

* * * * *